UNITED STATES PATENT OFFICE.

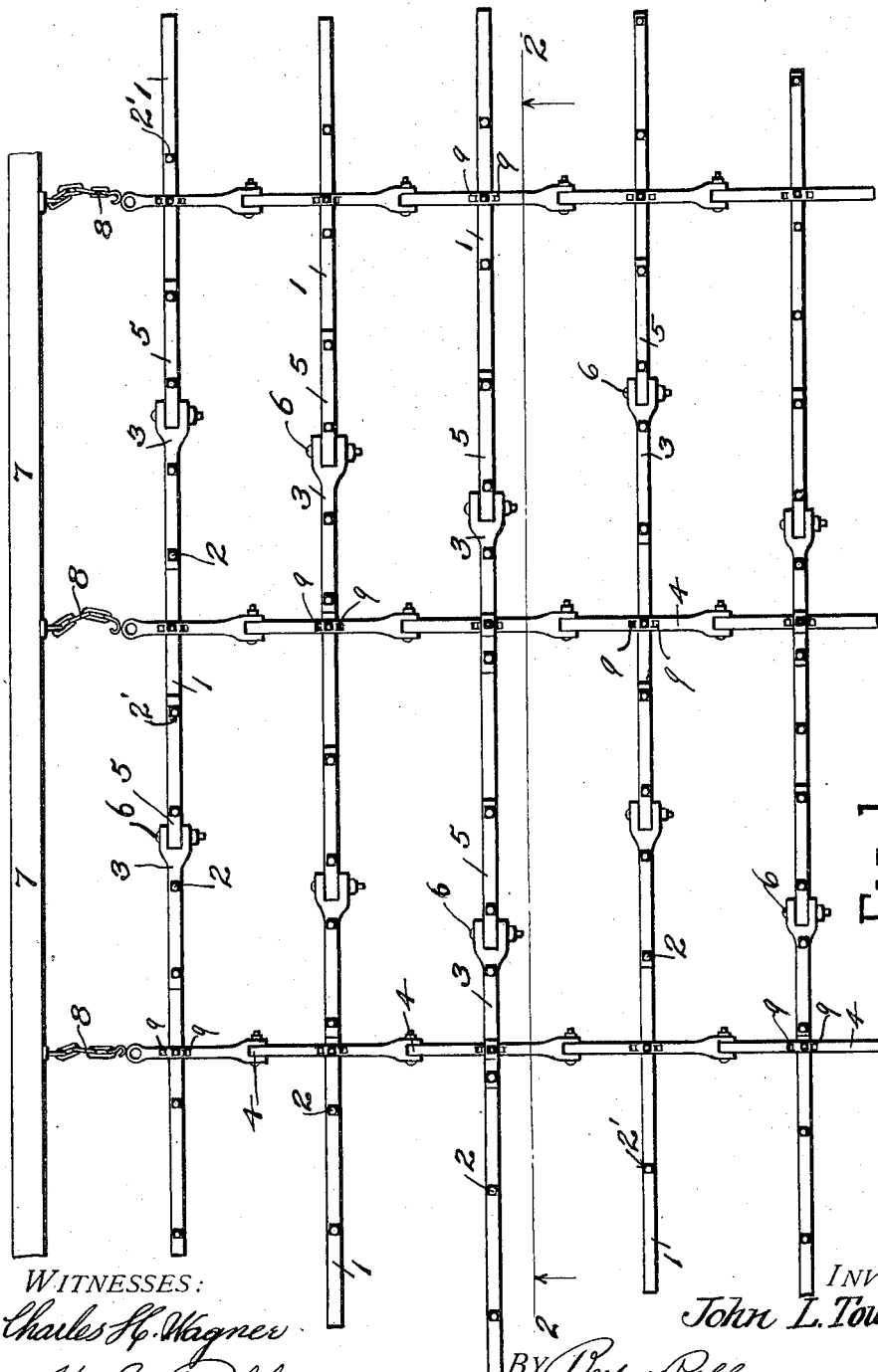

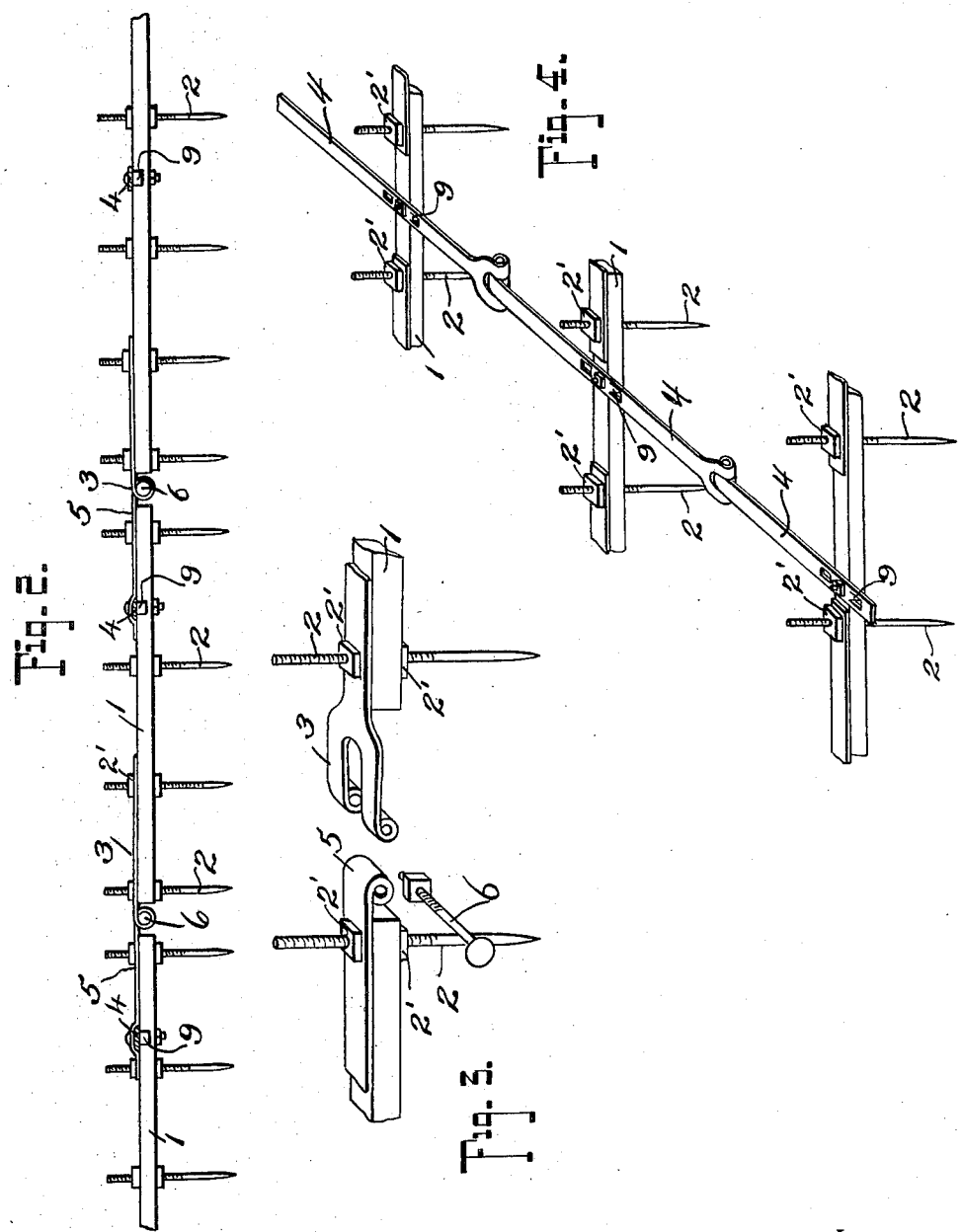

JOHN L. TOWNSEND, OF WINFRED, SOUTH DAKOTA.

FLEXIBLE HARROW.

1,029,154. Specification of Letters Patent. Patented June 11, 1912.

Application filed July 14, 1911. Serial No. 638,532.

*To all whom it may concern:*

Be it known that I, JOHN L. TOWNSEND, a citizen of the United States, residing at Winfred, in the county of Lake and State of South Dakota, have invented certain new and useful Improvements in Flexible Harrows, of which the following is a specification.

There are a number of conditions entering into the use of a spike harrow which make it exceedingly desirable that the same be of flexible construction, such, for example, as to permit of packing into small compass for transportation purposes, and the object of this invention is to provide a structure that will most effectively serve such advantages.

In addition to the foregoing, the advantageous feature of this device lies in the peculiar form of journal members coöperating with the teeth and transverse bars of which the harrow is composed whereby a durable and flexible structure is provided which will enable the same to adjust itself more readily to uneven ground in the operation thereof over the latter.

With the above and other objects in view, this invention consists in the construction, combination, and arrangement of parts, all as hereinafter more fully described, claimed, and illustrated in the accompanying drawings, wherein—

Figure 1 is a top plan view of a section of a harrow embodying the invention; Fig. 2 is a vertical section on the line 2—2 of Fig. 1; Fig. 3 is a partial view in perspective showing the manner of connecting the sections of the transverse bars; and Fig. 4 is a partial view in perspective showing the connection of the transverse bars by the coupling members.

Throughout the following detail description and on the several figures of the drawings, similar parts are referred to by like reference characters.

Referring to the drawings, the harrow embodying this invention is provided with a suitable number of transverse toothed bars comprising the sections 1 having openings at suitable intervals therein for the usual spike teeth 2. Mounted on one extremity of each of the transverse sections 1 is the journal member 3 which is secured to the said sections by the insertion of certain of the teeth 2 through openings therein, said teeth being threaded at their upper portion to accommodate nuts 2' between which the sections and the journal member are clamped together. The journal member 3 is bifurcated at one end and receives therebetween the end of the journal member 5 which is secured to the next section of the transverse bar in a similar manner to the journal member 3, said members 3 and 5 being connected together by means of pivot bolts 6.

At a point intermediate the ends of the sections 1 and at right angles thereto are rigidly secured by means of fastenings such as rivets or bolts the coupling members 4. The coupling members 4 are bifurcated at their rear extremity and receive therebetween the forward extremity of the coupling member secured to the following transverse bar, being connected together by means of pivot bolts in a manner hereinbefore described in connection with the journal members 3 and 5.

As will be clearly seen in Fig. 1 of the drawings, the teeth 2 in the transverse bars are arranged in a staggered manner for the well known purpose of thoroughly breaking the soil and, by this arrangement, certain of the journal members will intersect the coupling members 4, in which case the said journal members are bent so as to fit over the coupling member and the bolt is passed through the same. In this way, the sections of the harrow are reinforced.

The coupling members 4 secured to the forward transverse bar have their front extremity formed with an eye, by means of which the draw bar 7 is attached to the harrow through the instrumentality of the flexible connections 8.

While it is not essential, I prefer to form the coupling members with flanges 9, said flanges being stamped out of the metal and extending downwardly on each side of the transverse sections 1. In this manner the connection between the coupling member 4 and the section 1 is greatly reinforced.

It will thus be seen from the foregoing that the harrow structure as described may be folded back upon itself to permit the device to be placed on a vehicle for transportation from one place to another. It will also be apparent that the pivotal connections between the journal members will allow the harrow sections to flex and adjust themselves to the unevenness in the ground over which the harrow is dragged.

In the use of the device hereinbefore described, it is contemplated that any number of harrow sections as shown in Fig. 1 may be employed to most effectively perform their function.

Having thus fully described my invention, what is claimed as new is:—.

1. In a flexible harrow, the combination of a plurality of transverse bars composed of sections, journal members pivotally connecting said sections, teeth mounted in said bars, certain of said teeth coöperating with the sections and journal members to clamp and hold the same in position, and coupling members pivotally connecting the transverse bars.

2. In a flexible harrow, the combination of a plurality of transverse bars composed of sections, teeth mounted on said bars, journal members pivotally connecting said sections, teeth threaded at their upper extremity and passing through openings in the journal members and sections, nuts screwed to said threaded portion above and below the journal members and sections to receive and clamp the same therebetween, coupling members secured to the sections at right angles thereto and pivotally connecting the transverse bars, and flanges on the coupling members to engage over said sections.

In testimony whereof I affix my signature in presence of two witnesses.

JOHN L. TOWNSEND.

Witnesses:
W. G. WILLIAMS,
M. A. CHAPIN.